July 21, 1925.  1,546,822
R. N. W. BLIGH
PORTABLE APPARATUS FOR SEPARATING MINERALS AND
PRECIOUS STONES FROM ALLUVIAL WASH
Filed July 27, 1921

Inventor
Roger Nunn William Bligh
By Edm Wallace White
Attorney

Patented July 21, 1925.

1,546,822

UNITED STATES PATENT OFFICE.

ROGER NUNN WILLIAM BLIGH, OF RANGEVILLE, QUEENSLAND, AUSTRALIA.

PORTABLE APPARATUS FOR SEPARATING MINERALS AND PRECIOUS STONES FROM ALLUVIAL WASH.

Application filed July 27, 1921. Serial No. 487,889.

*To all whom it may concern:*

Be it known that ROGER NUNN WILLIAM BLIGH, a subject of the King of the United Kingdom of Great Britain and Ireland, residing at Rangeville, Toowoomba, in the State of Queensland, Commonwealth of Australia, has invented new and useful Improvements in Portable Apparatus for Separating Minerals and Precious Stones from Alluvial Wash, of which the following is a specification.

This invention relates to an improved apparatus for separating minerals and precious stones from alluvial wash whereby minerals and precious stones can be efficiently and economically recovered by a dry process.

The invention consists of an interrupted wave table fitted with riffles above and below the floor level. Above the top riffles and attached to the walls of the wave table are two perforated plates the holes of which in the two plates vary in diameter, or wire screens of different mesh may be used in lieu of the plates, or I may employ one plate the whole length of the table, the holes in the plate covering the discharge end or smaller section of the table being larger than those in the upper section.

Between the upper and lower riffles are layers of fine mesh fabric and fine wire screening, these two layers forming the floor of the wave table.

The riffles fixed below the floor level are similar to the top riffles but of lesser dimensions, they also decrease in size from the lower ends of the two sections of the wave table to the upper ends and are tacked on to the top riffles below the floor of the table.

On the underside of the wave table is a volume box formed in two sections corresponding with those of the wave table and fastened thereto by any suitable means to insure an air tight joint.

Two pipes are fixed to the lower end of the volume box, one of which terminates just within the volume box and the other extended into the upper section of same for the purpose of conveying an intermittent blast of air from a blower and regulating valve.

To fully describe the invention reference is now made to the drawings in which:—

Figure 1:
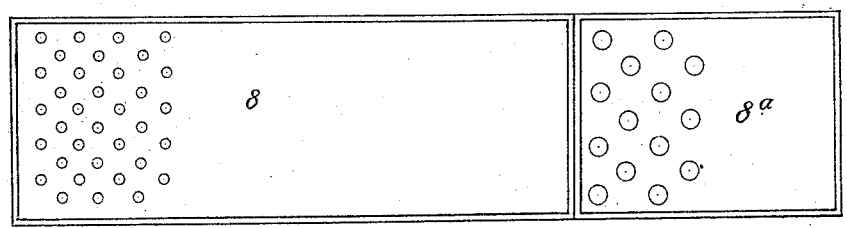

Fig. 1, is a plan view of the perforated plates fixed above the wave table.

Figure 2:
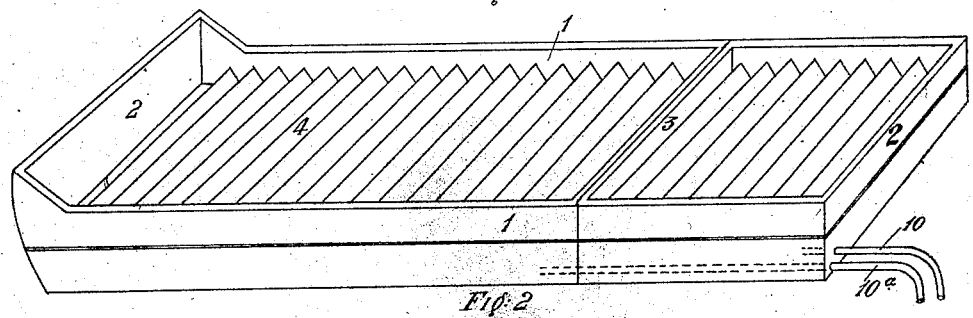

Fig. 2, perspective view of the wave table.

Figure 3:
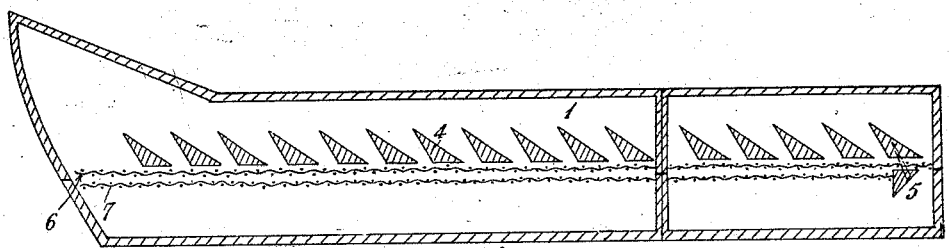

Fig. 3, longitudinal section of the wave table and volume box.

Figure 4:
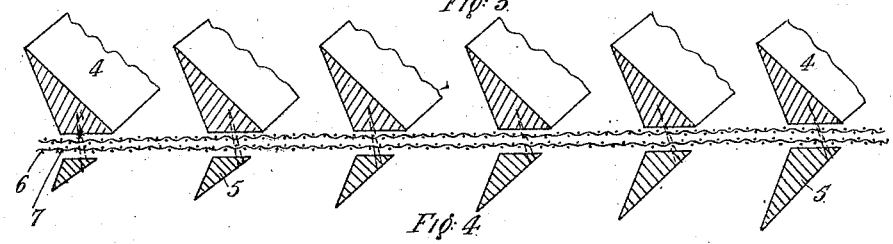

Fig. 4, perspective view of the riffles to enlarged scale.

Figure 5:
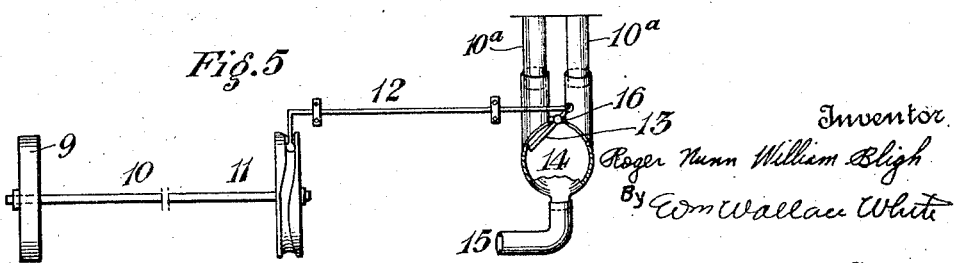

Fig. 5 is a front elevation of the regulating valve and the means for operating it.

1 are the side walls of the wave table, 2 the end walls and 3 the partition walls between the two sections, 4 the top riffles and 5 the bottom riffles.

The top riffles are fastened to the walls of the table which are preferably constructed of sheet metal, by any suitable means, and the bottom riffles are tacked on to the bottom of the top riffles.

The top riffles are for the purpose of arresting the flow of minerals or precious stones and the bottom riffles for directing the blasts of air to the further ends of each section of the volume box when starting operations.

The bottom riffles act as baffle plates and decrease in size from one end of the wave table to the other, whereby the resistance against the blasts of air decreases as the distance from the blast increases.

6 is a layer of fine mesh fabric and 7 a wire screen of about one sixteenth of an inch mesh. These are fastened to the walls of the wave table and tacked on to the bottom of the top riffles and form the floor of the wave table.

8 and 8ª are perforated plates, the holes in plate 8 being of smaller diameter than those in plate 8ª, for the purpose of grading the wash dirt. The plate 8 covers about two thirds of the length of the wave table forming the upper section, and plate 8ª one third of the length forming the lower section.

For effectively separating the wash dirt from the mineral or precious stones, I have provided means for intermittently supplying blasts of air to the volume box. As shown herein, this means comprises an air chamber 14 which is connected by means of a pipe 15 with a blower (not shown) or other source of air supply, said air chamber being also connected by means of a pair of pipes 10ª with the volume box. Pivotally mounted in the chamber 14 is a poppet valve 13, the pivot 16 of which is disposed midway between the pipes 10ª, so that when the valve is swung toward one side of the chamber 14 it shuts off communication with one of said pipes while leaving the other pipe in communication with the chamber, and when swung toward the opposite side the second pipe is closed and the other opened. The valve carries a short operating handle or lever which projects outside of the chamber 14, and to which lever is pivotally connected a rod 12 mounted for sliding movement toward and from the chamber. For operating the rod 12, a rotatable shaft 10 is provided, which shaft carries a pulley 11 having in its periphery an eccentric groove in which is guided a crank arm carried by the rod 12. The shaft 10 is provided with a pulley 9 whereby the same may be rotated by means of a belt connection from any suitable source of power. It will be readily seen that as the shaft 10 rotates the eccentric groove in the pulley 11 will cause the rod 12 to reciprocate and thus alternately close one or the other of the pipes 10$^a$.

Any number of these wave tables and volume boxes may be used by mounting the same upon a suitable stand set at an incline of about five inches to the foot. This however may be varied by raising or lowering the lower end or ends according to whether one or more of the tables are used, the smaller sections of the table being the lower ends of the same when in inclined position.

I have described the apparatus as consisting of a single table interrupted by a partition wall, thus forming two sections, but I would have it understood that each section may consist of a separate table and when mounted on a stand be joined together endwise.

In using the invention the wash dirt is discharged on to the upper end of plate 8, the blast turned on and conveyed through the pipes 10$^a$ to the volume box, and when the latter is full of air the continued pressure from the blower forces the air through the screen and fine mesh fabric, said air escaping between the riffles and causing a wave-like movement of the dry wash dirt leaving the mineral or precious stones arrested in the spaces between the riffles and discharging the wash dirt free from minerals or precious stones over the lower end of the wave table, from whence it falls on to any suitable conveyor for transport to the tailing heap.

The wave table can be detached from the volume box and the plates from the table at any time for the purpose of removing the recovered and separated minerals or precious stones.

What I do claim as my invention, and desire to secure by Letters Patent is:—

1. A portable separating apparatus, comprising in combination, a stationary interrupted wave table having a floor formed of fine mesh fabric and wire screen, riffles above and below said floor, the lower riffles gradually diminishing in size from one end of the table toward the other, and a volume box detachably secured to the underside of the table and enclosing said lower riffles.

2. A portable separating apparatus, comprising in combination, a stationary interrupted wave table having a floor formed of fine mesh fabric and wire screen, a perforated plate disposed above said table and having perforations of varying diameters, riffles above and below said floor, a volume box detachably secured to said table below said floor and enclosing said lower riffles, and means for intermittently delivering blasts of air into said volume box, the lower riffles diminishing in size from one end of the wave table toward the other whereby the resistance against the blasts of air decreases as the distance from the blasts increases.

In testimony whereof he has signed his name to this specification.

ROGER NUNN WILLIAM BLIGH.